Jan. 30, 1968       R. W. LUEDERS       3,366,719
METHOD AND APPARATUS FOR CONTINUOUSLY PRODUCING TUBING
Filed Aug. 21, 1964
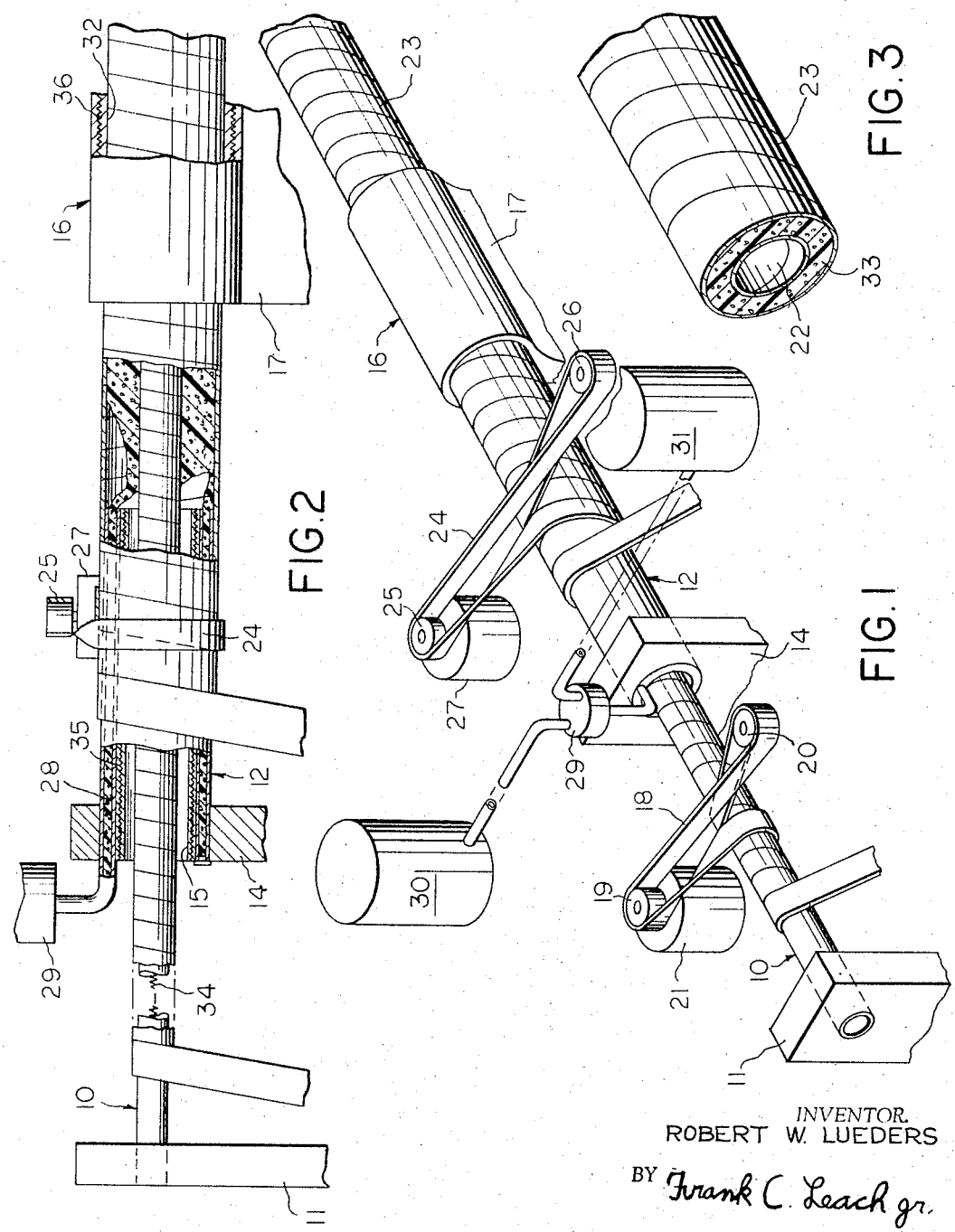
INVENTOR.
ROBERT W. LUEDERS
BY Frank C. Leach jr.
HIS ATTORNEY United States Patent Office 3,366,719
Patented Jan. 30, 1968

3,366,719
METHOD AND APPARATUS FOR CONTINU-
OUSLY PRODUCING TUBING
Robert W. Lueders, Lancaster, Pa., assignor to Armstrong
Cork Company, Lancaster, Pa., a corporation of
Pennsylvania
Filed Aug. 21, 1964, Ser. No. 391,224
4 Claims. (Cl. 264—47)

ABSTRACT OF THE DISCLOSURE

The method and apparatus for producing a foamed-in-place tubing of resilient or rigid structure having helically wound inner and outer tubular members with an integrally foamed inner core. The apparatus for carrying out the method includes a dual mandrel arrangement having means for helically winding and advancing inner and outer tubular members about the mandrels and foam supply means integral with the second mandrel for introducing foam between the advancing helically wound inner and outer cores. Heating means may be included in the apparatus whereby the curing rate of the foam may be accelerated.

---

This invention relates to a method and apparatus for producing tubing and, more particularly, to a method and apparatus for continuously forming a resilient or rigid tubing with a foaming material between inner and outer coverings of the tubing.

Molds have been employed to form an insulated tubing with foaming material as the insulating material. However, one disadvantage in using a mold is that a continuous length of tubing can not be produced as the length is determined by the configuration of the mold. Furthermore, when using a mold, additional operations are necessary to provide an inner liner and an outer covering for the insulation.

Another method of forming insulated tubing with foaming material as the insulating material is to use a plurality of rotating mandrels as described in an article beginning on page 106 of the March 1962 issue of Modern Plastics. However, a disadvantage of this method is that the length of the tubing is determined by the length of the mandrel so that a continuous length of tubing is not available. Furthermore, this method requires an extra operation to provide an outer layer or covering for the tubing. The inner liner is applied to the mandrel prior to the application of the foaming material.

The present invention satisfactory solves these problems by forming a continuous tube with both the inner liner and the outer covering being placed thereon during the same operation. Thus, the continuous operation of the present invention permits a tube of any length to be produced and, of course, the production is faster. Furthermore, no additional operations are necessary to provide the inner liner and the outer covering.

Accordingly, an object of this invention is to provide a continuous length of insulated tubing.

Another object of this invention is to provide a method and apparatus for forming a foamed insulated tube without the use of a mold.

A further object of this invention is to provide a foamed insulated tube with a substantial uniform insulation thickness.

Other objects will be readily perceived from the following description.

This invention relates to a method of continuously forming a tube including the steps of forming an inner liner, forming an outer covering about the inner liner in spaced relation thereto, and applying a forming material of low density between the formed inner liner and the formed outer covering to maintain them in spaced relation.

This invention also relates to an apparatus for continuously forming a tube including a first mandrel and a second mandrel surrounding the first mandrel and spaced longitudinally from both ends of the first mandrel. Means is employed to wind a material about the first mandrel between the forward end of the first mandrel and the forward end of the second mandrel to form an inner liner of the tube. Means is used to wind a material about the second mandrel to form an outer covering for the tube. Means supply a foaming material between the formed inner liner and the formed outer covering. The apparatus has means disposed about the first mandrel and spaced longitudinally from the terminal end of the second mandrel for cooperation with the first mandrel to maintain a substantially uniform thickness between the inner liner and the outer covering of the tube.

The attached drawing illustrates a preferred embodiment of the invention, in which FIGURE 1 is a perspective view of the apparatus of the present invention;

FIGURE 2 is a sectional view, partly in elevation, of the apparatus of FIGURE 1; and FIGURE 3 is a perspective view, partly in section, of the product formed by the present invention.

Referring to the drawing and particularly FIGURES 1 and 2, there is shown a mandrel 10 supported at one end by a frame 11. A cylindrical mandrel 12, which is supported at one end by a frame 14, surrounds the mandrel 10 and is spaced longitudinally from both ends of the mandrel 10. The mandrel 12 has a bore 15 of greater diameter than the constant outer diameter of the mandrel 10 to accommodate the mandrel 10 for passage therethrough.

An annular member 16, which is supported by a frame 17, is disposed beyond the terminal end of the mandrel 12. The member 16 surrounds the mandrel 10 and cooperates therewith to function as a centering ring.

A material, such as paper, plastic, or metal, for example, is helically wound on the mandrel 10 and advanced thereon toward the second mandrel 12 by a belt 18, which is helically wrapped around the mandrel 10 in frictional contact with the material. The belt 18 is wrapped around two spools 19 and 20, which are disposed on opposite sides of the mandrel 10. The spool 19 is connected to an electric motor 21, which results in the belt 18 rotating around the mandrel 10. The material is led on to the mandrel 10 at an angle and the angular rotation of the material on the mandrel 10 by the belt 18 causes the material to move longitudinally of the mandrel 10.

The motor 21, which supports the spool 19, is mounted on movable support means (not shown) such as a lathe, for example. This permits the motor 21 and the spool 19 to be moved toward or away from the mandrel 10 and parallel to the longitudinal axis of the mandrel 10. Similarly, the spool 20 is mounted on movable support means (not shown) such as a lathe, for example, whereby the spool 20 may be moved toward or away from the mandrel 10 and parallel to the longitudinal axis of the mandrel 10. This adjustment of the positions of the spools 19 and 20 permits the material to be led on to the mandrel 10 at any desired angle.

The specific material, which is wound on the mandrel 10, is selected in accordance with the intended use of the tube. For example, if the tube is to be employed as a carrier of a toxic gas at high temperatures, the material would be selected so as to provide the best chemical resistance to the gas. If the tube is to be utilized to carry a liquid, then the selected material would be impervious to the liquid. Thus, the specific material may be easily changed so that an inner liner or covering 22 (see FIGURE 3) for the tube is produced in accordance with the intended use of the tube.

A material, which forms the outer covering 23 of the tube, is helically wound on the mandrel 12 and advanced thereon by a belt 24, which is helically wrapped around the mandrel 12 in frictional contact with the material. The belt 24 is wrapped around two spools 25 and 26, which are disposed on opposite sides of the mandrel 12. An electric motor 27 is connected to the spool 25 to drive the belt 24. The material is let on to the mandrel 12 at an angle and the angular rotation of the material on the mandrel 12 by the belt 24 causes the material to move longitudinally of the mandrel 12.

The motor 27, which supports the spool 25, is mounted on movable support means (not shown) such as a lathe, for example. This permits the motor 27 and the spool 25 to be moved toward or away from the mandrel 12 and parallel to the longitudinal axis of the mandrel 12. Similarly, the spool 26 is mounted on movable support means (not shown) such as a lathe, for example, whereby the spool 26 may be moved toward or away from the mandrel 12 and parallel to the longitudinal axis of the mandrel 12. This adjustment of the positions of the spools 25 and 26 permits the material to be led on the mandrel 12 at any desired angle. The material, which is wound around the mandrel 12, may be paper, metal, or plastic, for example. The specific material depends upon the intended use of the tube. For example, if it is desired that the outer covering 23 be impervious to water, then the material must function as a vapor barrier. One example of a vapor barrier material would be a combination of aluminum foil and regular kraft paper.

Foaming material, which is chemically cured, is applied between the inner liner 22 and the outer covering 23 of the tube after they have been formed on the mandrels 10 and 12. The foaming material is selected in accordance with the desired physical properties of the insulating material, such as low density, low thermal transmission, high structural strength, and resistance to more chemicals. The foaming material also is selected in accordance with whether the formed tube is to be flexible or rigid.

Two suitable examples of the foaming material are foamed phenolic and rigid urethane foam. Both of these materials have their best thermal value, which permits them to function as an insulation material, at a density of about two pounds per cubic foot. This low density results in the material being of light weight and reduces the cost of the tube.

The foaming material is supplied through a passage 28 in the mandrel 12 from a foaming or mixing head 29, which is connected to a pair of supply reservoirs or tanks 30 and 31. The specific structure of the foaming or mixing head 29, the tanks 30 and 31, and any metering elements may be such as shown and described on pages 937–942 of the 1963 issue of Modern Plastics Encyclopedia, for example.

If foamed phenolic is selected as the foaming material, then the tank 30 contains phenolic resin. The tank 31 contains both a curing agent or catalyst and a foaming or blowing agent, such as formaldehyde, for example. The ratio of the resin to the foaming agent is selected to produce the desired properties in the finished foaming material.

If rigid urethane foam is selected as the foaming material, then the tank 30 contains a polyether or polyester and a catalyst or curing agent. The tank 31 contains an isocyanate resin such as tolylene diisocyanate, for example, and a foaming or blowing agent, such as a fluorinated hydrocarbon, which may be a combination of products sold under the trademarks Freon-11 and Freon-12 by E. I. du Pont.

The expansion rate of the foaming material is determined by the foaming agent. Thus, different rates of expansion may be obtained by using different ratios of the resin and the foaming agent. However, the foaming material must not expand to clog or block the passage 28. Accordingly, the motor 21 is regulated in accordance with the expansion rate of the foaming agent to insure that the foaming material does not expand to block or clog the passage 28 in the mandrel 12. After the foaming material leaves the passage 28, it must expand to fill the space between the outer covering 23 and the inner liner 22 of the tube to hold them in spaced relation to each other.

The annular member 16 is spaced a sufficient distance from the terminal end of the mandrel 12 to permit full expansion of the foaming material by the time that the forward end of the annular member 16 is reached. The annular member 16 has a bore 32 against which the outer layer or covering 23 of the tube engages. By cooperating with the mandrel 10, which extends through the annular member 16, a substantially uniform thickness of insulating material 33 (see FIGURE 3) between the inner liner 22 and the outer covering 23 of the tube is insured. The specific length of the tube is determined for its desired use and suitable means (not shown) is utilized to cut the tube at the desired length. It should be understood that no adhesives are required or employed between the inner liner 22 and the insulating material 33 or between the outer covering 23 and the insulating material 33.

If it is desired to accelerate the curing rate of the foaming material beyond that produced by the curing agent or catalyst or if the curing agent is omitted, suitable heating means may be employed in the mandrel 10, the mandrel 12, and the annular member 16. These heating means include a resistance element 24 in the interior of the mandrel 10, a resistance element 35 in the interior of the mandrel 12, and a resistance element 36 in the interior of the annular member 16. It should be understood that one or all of the resistance elements 34, 35, and 36 may be energized depending on the desired acceleration rate.

It should be understood that more than one material could be utilized to form the inner liner 22 and/or the outer covering 23 of the tube. If more than one material is employed, the additional material would be fed from a different angle than that shown for the single material. However, only the single driving mechanism is necessary.

An advantage of this invention is that the insulation material does not have to be wound on the inner liner of the tube. Another advantage of this invention is that both the inner liner and the outer covering of the tube may be formed in a single operation. A further advantage of this invention is that it is less expensive due to the low density of the foamed material. Still another advantage of this invention is that it permits an outer covering for the tube to be provided during a single forming operation for the entire tube.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:
1. A method of continuously forming a tube including the steps of helically winding and advancing an inner liner, helically winding and advancing an outer covering about the inner liner in spaced relation thereto, applying a foaming material of low density between the formed inner liner and the formed outer covering to maintain them in spaced relation, and centering the inner liner and the outer covering after the foaming material has been applied to maintain a substantially uniform distance therebetween.

2. The method in accordance with claim 1 in which the foaming material, after being introduced between the formed inner liner and the formed outer covering, is heated to accelerate the curing rate of the foam.

3. An apparatus for continuously forming a tube including a first mandrel, a second mandrel surrounding said first mandrel and spaced longitudinally in from both ends of said first mandrel, means for helically winding material about the first mandrel between the forward end of said first mandrel and the forward end of said second mandrel and for moving the helically wound material toward said second mandrel to form an inner liner, means for helically winding material about the second mandrel and for moving the helically wound material coextensively with said inner liner to form an outer covering, means associated with said second mandrel for supplying a foaming material between the formed inner liner and the formed outer covering, and an annular member disposed about the first mandrel and spaced longitudinally from the terminal end of said second mandrel for cooperation with said first mandrel whereby a substantially uniform thickness is maintained between the inner liner and the outer covering of the tube.

4. Apparatus in accordance with claim 3 in which the apparatus includes heating means whereby the curing rate of the foaming material may be accelerated.

References Cited

UNITED STATES PATENTS

| | | | |
|---|---|---|---|
| 2,918,940 | 12/1959 | Carr | 156—188 XR |
| 3,297,802 | 1/1967 | Powers | 264—47 |
| 3,118,800 | 1/1964 | Snelling | 264—47 |
| 3,207,651 | 9/1965 | Hood et al. | 156—500 |

FOREIGN PATENTS

| | | |
|---|---|---|
| 554,644 | 2/1957 | Belgium. |
| 965,185 | 7/1964 | Great Britain. |

ALEXANDER H. BRODMERKEL, *Primary Examiner.*

P. E. ANDERSON, *Assistant Examiner.*